United States Patent
Gettala et al.

(10) Patent No.: US 7,376,133 B2
(45) Date of Patent: May 20, 2008

(54) SYSTEM AND METHOD FOR PROVIDING COMMUNICATIONS IN A NETWORK USING A REDUNDANT SWITCHING ARCHITECTURE

(75) Inventors: Balachandar S. Gettala, Tamilnadu (IN); Philip L. Francis, Plano, TX (US); Gerald R. Dubois, Richardson, TX (US); Keith F. Deacon, Plano, TX (US)

(73) Assignee: Alcatel-Lucent, Paris (FR)

( * ) Notice: Subject to any disclaimer, the term of this patent is extended or adjusted under 35 U.S.C. 154(b) by 923 days.

(21) Appl. No.: 10/687,426

(22) Filed: Oct. 16, 2003

(65) Prior Publication Data

US 2005/0083833 A1 Apr. 21, 2005

(51) Int. Cl.
*H04L 12/28* (2006.01)
*H04L 12/56* (2006.01)

(52) U.S. Cl. .................................. 370/389; 370/466

(58) Field of Classification Search ........ 370/216–218, 370/225, 419, 389, 466
See application file for complete search history.

(56) References Cited

U.S. PATENT DOCUMENTS

2001/0055311 A1* 12/2001 Trachewsky et al. ....... 370/445
2002/0156612 A1* 10/2002 Schulter et al. ............... 703/23
2003/0048782 A1*  3/2003 Rogers et al. .............. 370/389

FOREIGN PATENT DOCUMENTS

| EP | 0645919 A2 | 3/1995 |
| EP | 1298862 A2 | 4/2003 |
| WO | 0013376 A1 | 3/2000 |
| WO | 02099676 A1 | 12/2002 |

* cited by examiner

*Primary Examiner*—Kevin C. Harper

(57) ABSTRACT

A system and method for sending and receiving information in a network using a redundant switching architecture. In one embodiment, the method includes generating a communications frame including a first header at a first control element. The first header is mapped to a second header and then the communications frame is encapsulated with a set of two redundant destination addresses whereby two instances of the communications frame are created. The communications frame instances, including the second header and the redundant destination addresses, are sent from the first control element via both a first switching plane and a second switching plane to a second control element. Upon receipt, only one of the communications frame instances is retained by the second control element for upstream processing.

15 Claims, 5 Drawing Sheets

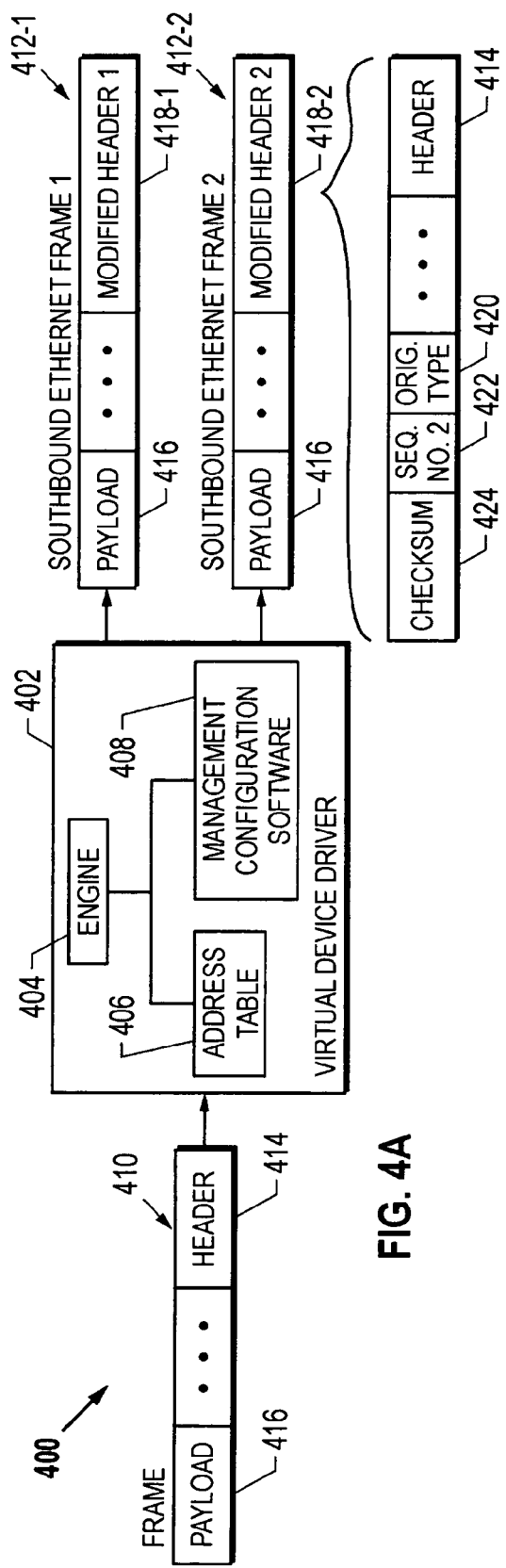
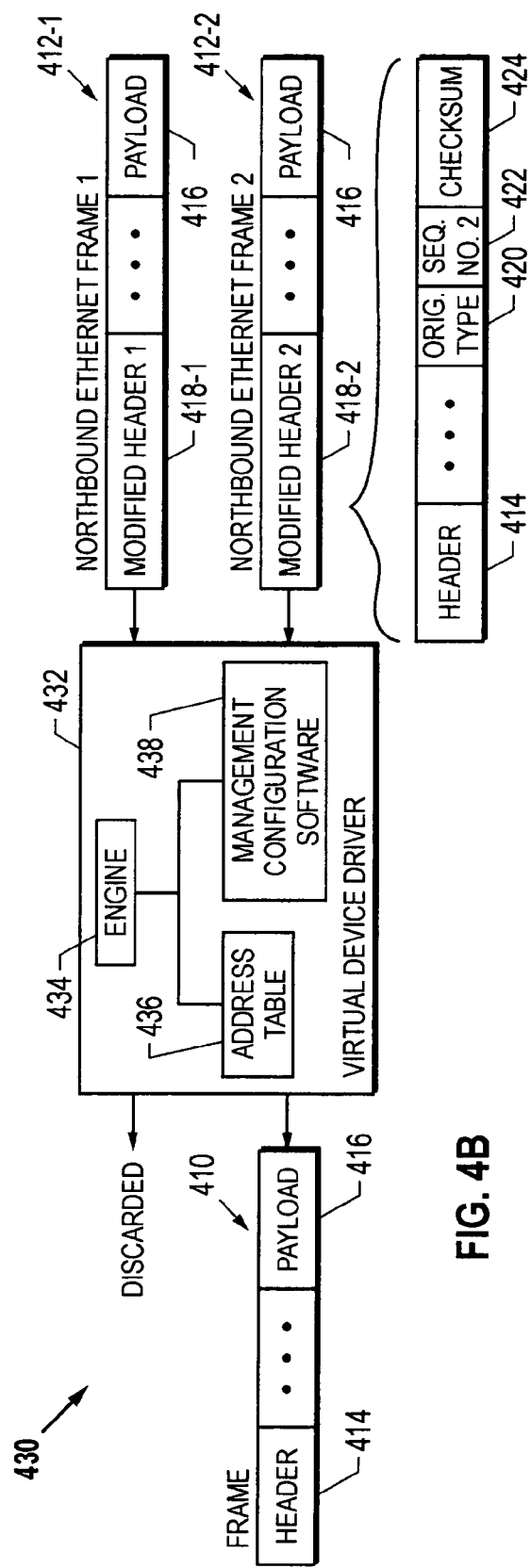
FIG. 4A
FIG. 4B

SYSTEM AND METHOD FOR PROVIDING COMMUNICATIONS IN A NETWORK USING A REDUNDANT SWITCHING ARCHITECTURE

BACKGROUND OF THE INVENTION

1. Technical Field of the Invention

The present invention generally relates to communication schemes in a network. More particularly, and not by way of any limitation, the present invention is directed to a system and method for providing communications in a network using a redundant switching architecture.

2. Description of Related Art

In computer networks as well as telecommunications networks, availability refers to the percentage of time that the network is ready for immediate use. A traditional benchmark for availability is 99.999%, or "five 9s," which translates into approximately 5.25 minutes of downtime per year. Five 9s availability is achieved through a combination of equipment reliability and network survivability. Other factors also play a role, including software stability and the ability to evolve or upgrade the network without taking the network out of service.

To satisfy these high expectations, telecommunications network nodes, e.g., signaling server systems that comprise a mesh of interconnected control elements (CEs), must be highly redundant, scalable, and capable of operating continuously under rugged ambient conditions and heavy traffic loads. In general, to provide redundancy for communications between CEs, primary and alternative switching planes are implemented. Primary switching planes provide the main mechanism of communication between two CEs. Upon detecting a fault in the primary switching plane, however, the server system provisions the alternative switching plane and switches the impacted traffic over to the alternative switching plane. The server system may then reconfigure the internal communication pathways accordingly and broadcast the affected routing tables.

The existing redundancy schemes are not without limitations, however. The time to detect a fault in the primary switching plane, the time to isolate the fault, the time to provision the alternative switching plane, and the time to switch over to the alternative switching plane each represent a potential source of data latency or, in more extreme cases, packet loss. Moreover, the administrative overhead created by CEs pinging each other in order to detect faults represents a drain on system resources. These drawbacks are particularly aggravating where a large number of CEs are interconnected in complex topologies.

SUMMARY OF THE INVENTION

Accordingly, the present invention is directed to a system and method for sending and receiving information in a network using a redundant switching architecture wherein these and other shortcomings are advantageously overcome. In one aspect, the present invention is directed to a system for sending information in a network using a redundant switching architecture. In an exemplary embodiment, the system includes a first control element executing a protocol stack having an internetwork layer in order to send a communications frame. A first device driver is associated with the first control element in order to communicate with a second control element via a first switching plane. Similarly, a second device driver is associated with the first control element in order to communicate with the second control element via a second switching plane. A virtual device driver is associated with the first control element and in communication with the internetwork layer, first device driver, and second device driver. The virtual device driver operates to map the communications frame from the internetwork layer to both the first and second device drivers.

By way of implementation, the protocol stack includes a host-to-host transport layer, such as a Transport Control Protocol (TCP)-based layer or a User Datagram Protocol (UDP)-based layer, positioned in communication with the internetwork layer. The protocol stack may further include an application layer positioned in communication with the host-to-host transport layer. The communications frame may include an Ethernet-based protocol that provides an Ethernet frame or an Ethernet frame including a sequence number that identifies a duplicate communication frame. The internetwork layer may comprise an Internet Protocol (IP)-based layer. The protocol stack may be instantiated in an operating system environment selected from the group consisting of Unix, Linux, Windows® NT®, and Sun® Solaris®.

In a further aspect, the present invention is directed to a system for receiving information in a network using a redundant switching architecture. The system may receive first and second instances of the communications frame and map one of the second instances of the communications frame received from the second control element to the internetwork layer.

In an additional aspect, the present invention is directed to a method that includes the operation of generating a communications frame including a first header at a first control element. The first header is mapped to a second header and then the communications frame is encapsulated with a set of two redundant destination addresses such that two instances of the communications frame are created. The communications frame instances, including the second header and the redundant destination addresses, are sent from the first control element via both a first switching plane and a second switching plane, which are received by a second control element, whereupon only one of the communications frame instances is retained for further processing by a protocol stack disposed thereat.

BRIEF DESCRIPTION OF THE DRAWINGS

The accompanying drawings are incorporated into and form a part of the specification to illustrate the preferred embodiments of the present invention. Various advantages and features of the invention will be understood from the following Detailed Description taken in connection with the appended claims and with reference to the attached drawing figures in which:

FIG. 4A depicts a schematic diagram of one embodiment of a virtual device driver handling southbound Ethernet communications in accordance with teachings of the present invention;

FIG. 4B depicts a schematic diagram of one embodiment of a virtual device driver handling northbound Ethernet communications in accordance with teachings of the present invention.

DETAILED DESCRIPTION OF THE DRAWINGS

Figure 1:
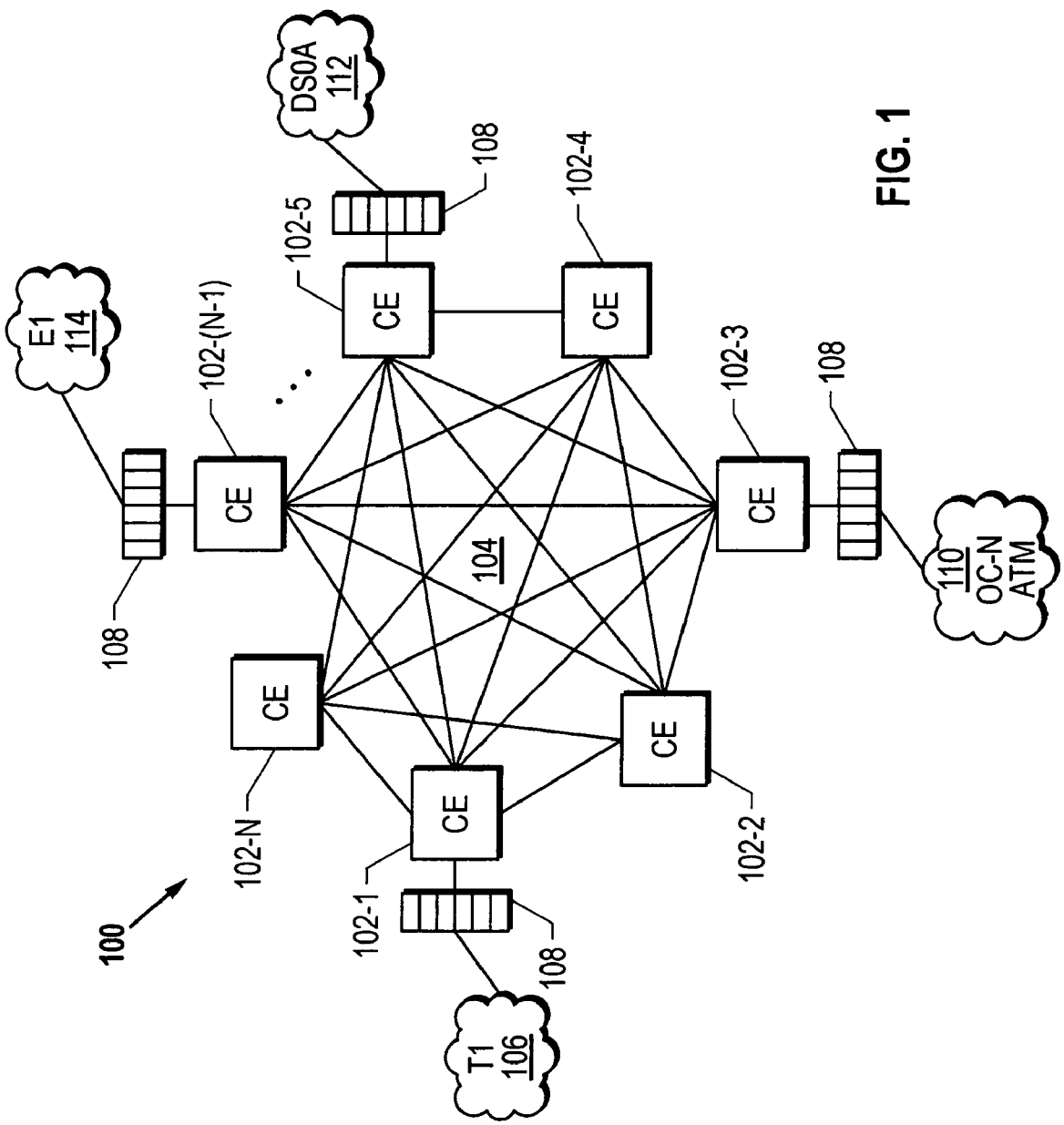
FIG. 1 depicts a high-level architectural view of a signaling server wherein a redundant communications scheme provided in accordance with the teachings of the present invention may be advantageously deployed.

Presently preferred embodiments of the invention will now be described with reference to various examples of how the invention can best be made and used. Like reference numerals are used throughout the description and several views of the drawings to indicate like or corresponding parts, wherein the various elements are not necessarily drawn to scale. Referring now to the drawings, and more particularly to FIG. 1, there is shown an exemplary representation of a signaling server 100 where a redundant communications scheme provided in accordance with the teachings of the present invention may be advantageously deployed. The signaling server 100 is preferably based on a distributed architecture of loosely coupled computing/control elements (CEs) or processors, e.g., reference numerals 102-1 through 102-N, networked together via a high-speed switching fabric 104. Each processor performs discrete functions in the control and maintenance of particular devices (not shown in this FIG.) and in the control of signaling, administrative, and/or maintenance functions. For example, one or more CEs are responsible for controlling the interfacing with the heterogenous telecommunications network environment within which the signaling server 100 is disposed for providing the signaling/switching services. In the exemplary architecture shown in FIG. 1, a T1 network 106 operating at 1.544 megabits per second (Mbps) (equivalent to 24 voice channels) is linked to the signaling server 10 via a plurality of ports 108 controlled by CE 102-1. Similarly, an Asynchronous Transfer Mode (ATM) network 110 capable of operating at a particular rate, e.g., Optical Carrier (OC)-3, OC-12, OC-48, OC-N, etc., is linked to the signaling server 100 via ports 108 controlled by CE 102-3. In analogous fashion, a DSOA network 112 operating at 64 kilobits per second (Kbps) and an E1 network 114 operating at 2.048 Mbps are also exemplified herein. It should be apparent to those skilled in the art that networks operating with other standards and protocols, e.g., Synchronous Optical Network (SONET) and its companion Synchronous Digital Hierarchy (SDH), Internet Protocol (IP), etc., may be linked to the signaling server 100 in certain implementations.

Figure 2:
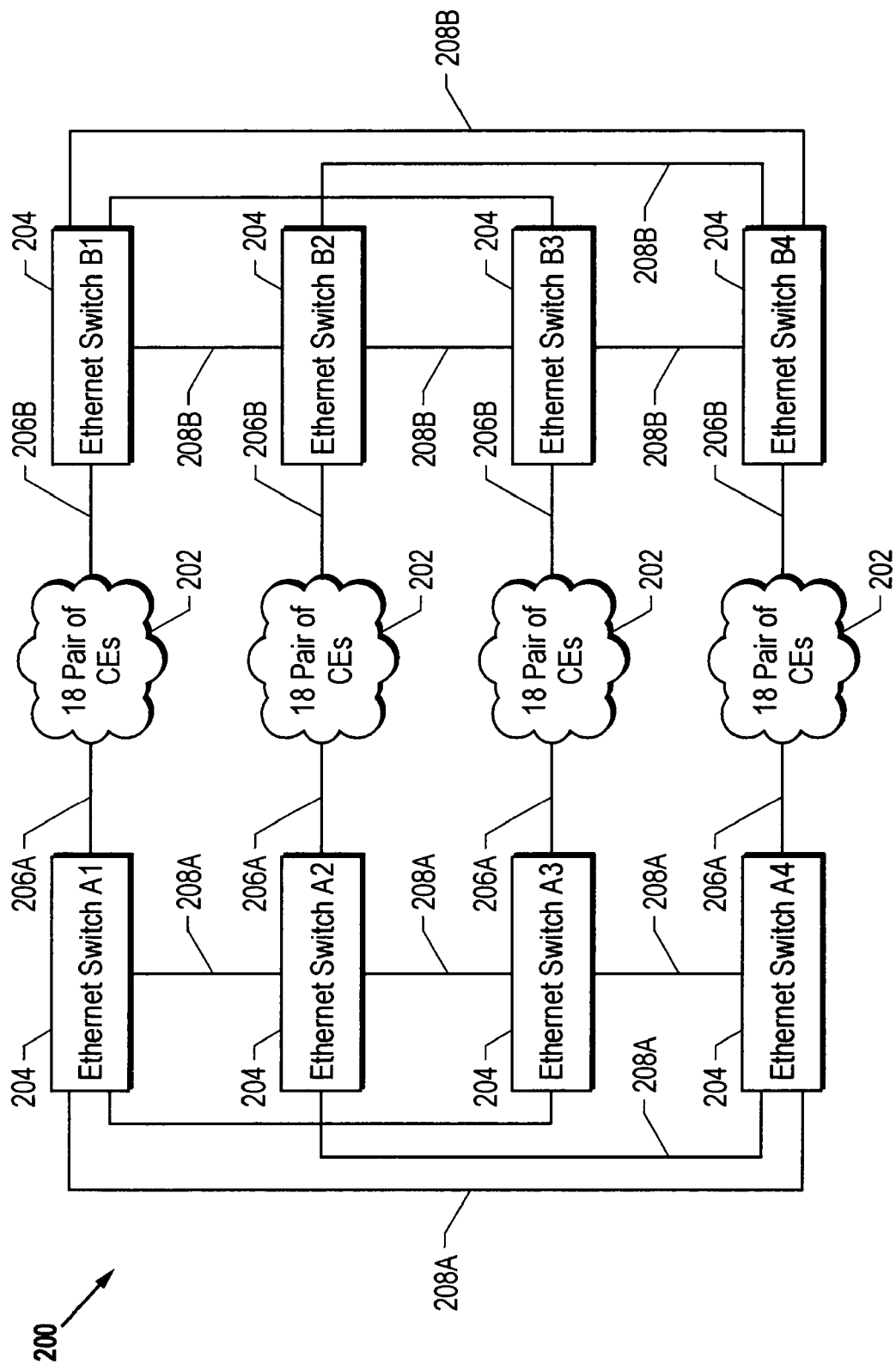
FIG. 2 depicts a schematic diagram of a scalable, redundant interconnect (switch fabric) architecture in accordance with an embodiment of the present invention.

FIG. 2 depicts a scalable, redundant interconnect (switch fabric) architecture 200 in accordance with an embodiment of the present invention. In particular, a switching fabric for connecting 144 CEs 202, i.e., 72 pairs, employing four pairs of 36-port Ethernet switches 204 is exemplified. Connection paths 206A and 206B exemplify the 100 Mbps links between the Ethernet switch ports and CEs. The inter-switch gigabit links are exemplified by six connection paths 208A on the A-side of the switching fabric and six connection paths 208B on the B-side of the switching fabric. As will be described in further detail hereinbelow, within each of the 18 pairs of CEs 202, first and second switching planes are provided in order to effectuate redundancy for communications between any two CEs of the 18 pairs of CEs 202. The redundant switching architecture of the present invention leverages the available bandwidth of the first and second switching planes by transmitting two instances of each communication frame (or any type of data unit) between the two CEs on the first and second switching planes. The CE receiving the duplicate communication frames retains one of the transmitted communication frames for processing by its internal protocol stack. Under this redundant switching architecture, fault detection time and fault isolation time are minimized while the need for switchover is obviated since both the first and second switching planes between any two CEs are utilized to transmit redundant instances of each communication data unit.

Figure 3:
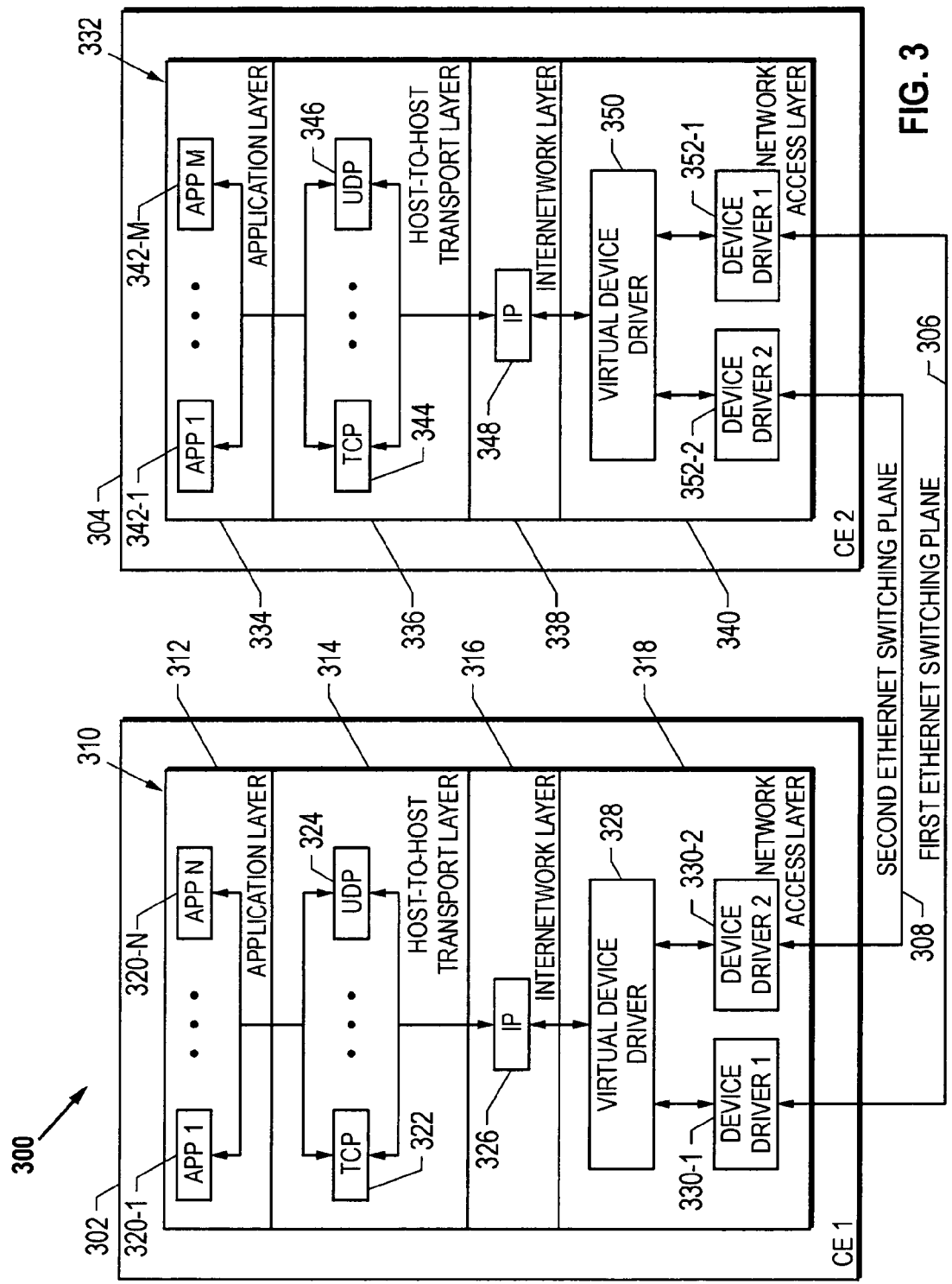
FIG. 3 depicts a schematic diagram of one embodiment of a system for providing communications between two control elements using a redundant switching architecture.

FIG. 3 depicts one embodiment of a system 300 for providing communications between two control elements 302 and 304 using a redundant switching architecture that includes a first Ethernet switching plane 306 and a second Ethernet switching plane 308. Each of the CEs may employ any commercially available operating system such as Unix, Linux, Windows® NT® or Sun® Solaris® or any proprietary operating system software. The CE 302 includes a protocol stack 310 defined by an application layer 312, a host-to-host transport layer 314, an internetwork layer 316, and a network access layer 318. It should be appreciated that the architectural model presented herein provides a common frame of reference for describing communications. Further, the redundant switching scheme of the present invention may be described in relation to any Ethernet-based protocols or other network stack protocols, such as those conforming to the Open Systems Interconnection (OSI) model, for example.

The top layer of the illustrated protocol stack 310, i.e., the application layer 312, includes applications 320-1 through 320-N (APP 1, ..., APP N) that provide functions for users or user-associated programs. The applications layer 310 may include all application protocols that use the host-to-host transport protocols to deliver data. Other functions that process user data, such as data encryption/decryption programs and compression/decompression programs, may also reside in the application layer 312.

The protocol layer just below the application layer 312 is the host-to-host transport layer 314 which is responsible for providing end-to-end data integrity and highly reliable communication services for CEs that carry out extended two-way communications. It should be appreciated that a variety of protocols may be associated with the transport layer 314. For example, as illustrated, a Transmission Control Protocol (TCP) suite 322 resides in the host-to-host transport layer 314 in order to provide reliable, sequenced, and unduplicated data delivery to a remote system. Additionally, a User Datagram Protocol (UDP) suite 324 resides in the host-to-host transport layer 314 in order to provide a mechanism for applications to access the connection features provided by the internetwork layer 316.

The internetwork layer 316, which resides above the network access layer 318 and below the host-to-host transport layer 314, is responsible for routing messages by providing a datagram network service. For example, as illustrated, an IP suite 326 may perform a variety of functions such as defining the datagram and defining the associated addressing scheme.

The network access layer 318 resides at the bottom of the protocol stack 310 and provides encapsulation of the IP datagrams provided by the internetwork layer 316 into frames for transmission over the network. As illustrated, a virtual device driver 328 is positioned between the internetwork layer 316 and two device drivers, device driver 330-1, and device driver 330-2. The virtual device driver 328 operates to map each communication data unit received from the internetwork layer to two southbound communication data unit duplicates which are sent via the device drivers 330-1 and 330-2 as outgoing communications. In this respect, the upper portions of the protocol stack 310, including the application layer 312, host-to-host transport layer 314, and internetwork layer 316, see only one device driver, i.e., the virtual device driver 328. Additionally, the virtual device driver 328 operates to map one of the two instances of a northbound communication data unit received by the device drivers 330-1 and 330-2 (i.e., incoming communications) to the internetwork layer. In this respect, the virtual device driver 328 is transparent to the device drivers 330-1 and 330-2 and the device drivers 330-1 and 330-2 "see" only the upper portions of the protocol stack.

The CE 304 has a similar structure and functionality with respect to its communication data processing. In particular, CE 304 includes a protocol stack 332 comprising an application layer 334, a host-to-host transport layer 336, an internetwork layer 338, and a network access layer 340. The application layer 334 includes applications 342-1 through 342-M. The host-to-host transport layer 336 includes a TCP suite 344 and a UDP suite 346. The internetwork layer 338 includes an IP suite 348. The network access layer 340 includes a virtual device driver 350 that provides for the mapping of communications between the internetwork layer 338 and device drivers 352-1 and 352-2.

In an operation to send data from CE 302 to CE 304, for example, data is passed down the protocol stack 310 from the application layer 312 to the network access layer 318. At each layer along the way, the data is further encapsulated by adding control information such as destination address, routing controls and checksum data in order to ensure proper delivery. These wrapped messages are passed down the stack such that when the original message created by the application layer reaches the network access layer, it is enveloped in multiple nested wrappers, constituting an "aggregate payload" for network access layer 318. At the network access layer, the virtual device driver 328 creates two instances of the encapsulated message for transmission to the CE 304 by the device drivers 330-1 and 330-2. As will be described in more detail hereinbelow, each instance of the encapsulated message created by the virtual device driver 328 includes a modified header that provides for receipt and processing of the encapsulated message by the virtual device driver 350 of CE 304. The device drivers 330-1 and 330-2 further encapsulate the two instances of the encapsulated message and send the messages via the first Ethernet switching plane 306 and the second Ethernet switching plane 308 to the device drivers 352-1 and 352-2, respectively.

Upon receiving the encapsulated messages, the device drivers 352-1 and 352-2 decapsulate the message instances and forward the "aggregate payload" to the virtual device driver 350. As will be explained in more detail hereinbelow, the virtual device driver 350 retains only one instance of the message based on information stored in the modified header. Additionally, the virtual device driver 350 modifies the previously modified header based on information stored in the modified header, and forwards the message up the protocol stack 332 for further decapsulation and processing. Accordingly, by sending two instances of each communication from CE 302 to CE 304, latency in recreating an impacted data flow for effective switch over is eliminated, as the protocol stack 302 processes the first received and error-free instance of the redundant communication frame transmitted.

FIG. 4A depicts one embodiment of a southbound traffic scenario 400 wherein a virtual device driver 402 is operable to handle southbound Ethernet communications (i.e., outgoing communications) in accordance with teachings of the present invention. The virtual device driver 402 includes an engine 404, address table structure 406, and management configuration software 408. The engine 404 may provide address translation, mapping, and related services to support communications between the internetwork layer of the protocol stack and the two device drivers. The address table structure 406 participates in creating the necessary address tables that may be employed in any requisite traffic forwarding and address translation operations. The management and configuration software 408 associated with the engine 404 and address table structure 406 is operable to participate in managing routing protocols and preforming any necessary protocol translations. Traffic arrives at an input interface of the virtual device driver as frame 410 and the engine 404 forwards the traffic as southbound Ethernet frame 412-1 and southbound Ethernet frame 412-2 to the device driver 1 and device driver 2, respectively, for further encapsulation and forwarding to another CE on the network. The frame includes a header 414 and a payload 416. The header 414 may include control information such as bit synchronization and payload length, for example. It should be appreciated that depending on the protocol employed, the header may also include the destination address block and the source address block, i.e., the address information of the frame 410. The payload 416 may be of fixed or variable length. Moreover, the frame 410 may include additional packet portions such as a trailer and additional packet functionalities such as error detection and bit correction.

In operation, the frame 410 originated at the internetwork layer of the protocol stack and is bound for a CE via the first and second device drivers and corresponding first and second Ethernet switching planes. The engine 404 of the virtual device driver 402 employs the address table structure 406 and the management configuration software 408 to generate two instances of the frame 410 wherein the header 414 of the frame 410 is replaced with modified headers 418-1 and 418-2. More specifically, with reference to the expanded view of modified header 418-2, the modified header 418-2 includes the header 414, an original type field 420, a sequence number field 422, and a checksum field 424.

The original type packet 420 provides the instructions necessary to return the modified header 418-2 to the header 414. In one embodiment of the present invention, the virtual device driver employs an Ethernet protocol having a modified message transmission unit (MTU) and the engine 404 maps the original packet type to the modified Ethernet type. In this embodiment, the original packet type 420 specifies the original Ethernet protocol that comports with the internetwork layer's view that the control element has only one device driver. The sequence number field 422 specifies a sequence number which may be employed to determine if the particular southbound Ethernet frame is a duplicate. The checksum field 424 provides a checksum which may be employed to determine the integrity of the frame.

FIG. 4B depicts one embodiment of northbound Ethernet traffic scenario 430 wherein a virtual device driver 432 is operable to handle northbound Ethernet communications (i.e., incoming communications) in accordance with the teachings of the present invention. As illustrated, the southbound Ethernet frames 412-1 and 412-2 sent by the virtual device driver 402 via two egress device drivers of one CE (shown in FIG. 4A) are operable as northbound Ethernet frames 412-1 and 412-2 that have been received by a set of ingress device drivers of a receiver CE, which are decapsulated and forwarded to the virtual device driver 432 for processing.

Similar to the egress virtual device driver 402, the ingress virtual device driver 432 includes an engine 434, an address table 436, and management configuration software 438. Upon receiving the northbound Ethernet frames 412-1 and 412-2, the engine 434 examines the sequence number fields, such as the sequence number field 422 of northbound Ethernet frame 412-2, in order to determine if the received frame is a duplicate. Additionally, the engine 434 examines the checksum fields, such as the checksum field 424 of northbound Ethernet frame 412-2, in order to determine if the field was received error-free. The engine 434 employs the address table 436 and management configuration software 438 to forward the first received northbound Ethernet frame up the protocol stack for further processing. In particular, the engine 434 processes the modified header of the first received, error-free northbound Ethernet frame. As illustrated, the northbound Ethernet frame 414-2 is the first received, error-free frame. Accordingly, the engine 434 processes the modified header 418-2 of the frame 412-2 based on the information stored in the original type packet 420 and sends the northbound Ethernet frame 412-2 up the protocol stack as frame 410 which includes header 414 and payload 416. The redundant northbound Ethernet frame 412-1 is discarded by the engine 434 for one of several possible reasons. For example, the engine 434 may have found an error in the frame 412-1 upon processing its checksum field. Alternatively, the frame 412-1 may have been error-free, but received second in time with respect to the frame 412-2. In this case, upon processing the sequence number of the frame 412-1, the engine 434 would have realized that the frame 412-1 was a duplicate. Accordingly, the present invention provides for two instances of each communication in order to ensure greater network availability. In particular, the virtual device driver of the present invention manages the two instances of each communication in a manner that minimizes administrative overhead.

Figure 5:
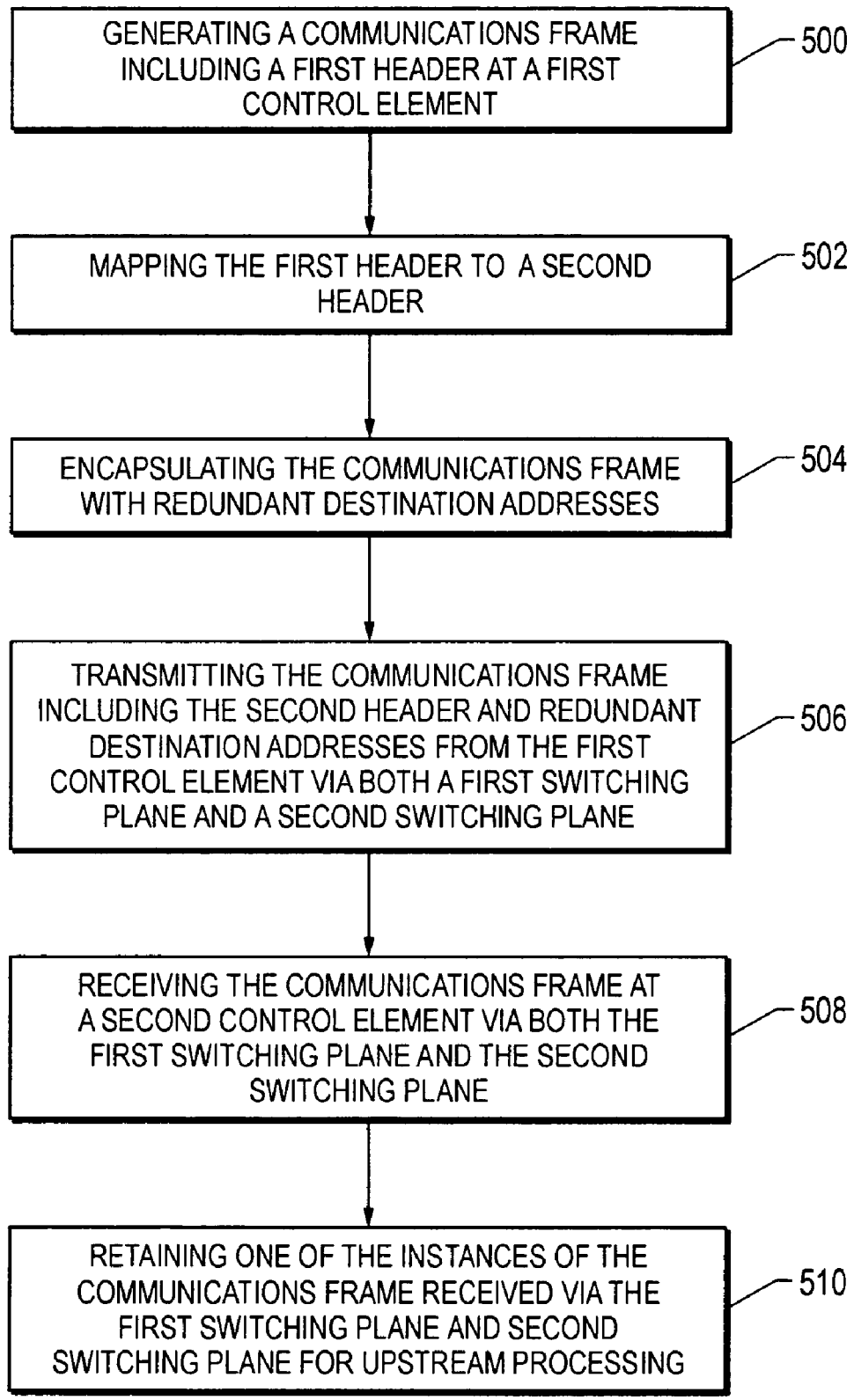
FIG. 5 depicts a flow chart illustrating one embodiment of a method for providing communications between two control elements using a redundant switching architecture.

FIG. 5 depicts one embodiment of a method for providing communications between two control elements using a redundant switching architecture. At block 500, a communications frame, including a first header at a first control element, is generated. At block 502, the first header is mapped to a second header. At block 504, the communications frame is encapsulated with redundant destination addresses. At block 506, the communications frame, including the second header and redundant destination addresses from the first control element, is transmitted via both a first switching plane and a second switching plane. At block 508, the communications frame is received at a second control element via both the first switching plane and the second switching plane. At block 510, one of the instances of the communications frame received via the first switching plane and second switching plane is retained for upstream processing. As a part of the retaining operation, the drivers which receive the instances of the communications frame decapsulate the instances of the communications frame, and forward the decapsulated instances of the communications frame to the virtual device driver. The virtual device driver, in turn, retains the first error-free communications frame received for upstream processing. The virtual device driver may discard a communications frame, for example, if it has an error or if it is received second in time.

Based on the foregoing Detailed Description, those skilled in the art should appreciate that the redundant architecture of the present invention significantly reduces fault detection time as well as fault isolation while eliminating the need for a fault-induced switchover. Additionally, the redundant switching architecture of the present invention minimizes administrative overhead. These results are achieved by leveraging the bandwidth of the network in order to send two instances of each communication over redundant switching planes.

Although the invention has been described with reference to certain exemplary embodiments, it is to be understood that the forms of the invention shown and described are to be treated as presently preferred exemplary embodiments only. Various changes, substitutions and modifications can be realized without departing from the spirit and scope of the invention as defined by the appended claims.

What is claimed is:

1. A system for receiving information in a network using a redundant switching architecture, comprising:
    a first control element for executing a protocol stack having an internetwork layer;
    a first device driver associated with said first control element, said first device driver for receiving a first instance of a communications frame from a second control element via a first switching plane and for decapsulating the first instance of the communications frame;
    a second device driver associated with said first control element, said second device driver for receiving a second instance of said communications frame from said second control element via a second switching plane and for decapsulating the second instance of the communications frame; and
    a virtual device driver associated with said first control element, said virtual device driver being positioned in communication with said internetwork layer, first device driver, and second device driver,
    wherein said virtual device driver operates to map one of said first and second instances of said communications frame received from said second control element to said internetwork layer and to retain one of said communications frame instances received via said first switching plane and said second switching plane based on an indicator in at least one of said decapsulated communications frame instances.

2. The system as recited in claim 1, wherein said protocol stack comprises a host-to-host transport layer positioned in communication with said internetwork layer.

3. The system as recited in claim 2, wherein said host-to-host transport layer comprises a Transport Control Protocol (TCP)-based layer.

4. The system as recited in claim 2, wherein said host-to-host transport layer comprises a User Datagram Protocol (UDP)-based layer.

5. The system as recited in claim 2, wherein said protocol stack comprises an application layer positioned in communication with said host-to-host transport layer.

6. The system as recited in claim 1, wherein said communications frame conforms to an Ethernet-based protocol.

7. The system as recited in claim 1, wherein said communications frame comprises an Ethernet frame including a sequence number, said sequence number for identifying a duplicate communications frame.

8. The system as recited in claim 1, wherein said internetwork layer comprises an Internet Protocol (IP)-based layer.

9. The system as recited in claim 1, wherein said protocol stack is instantiated in an operating system environment selected from the group consisting of Unix, Linux, Windows® NT®, and Sun® Solaris®.

10. A communications method in a network using a redundant switching architecture, the method comprising the steps of:
- generating a communications frame including a first header at a first control element;
- mapping said first header to a second header and encapsulating said communications frame with a set of two redundant destination addresses, whereby two instances of said communications frame are created;
- transmitting said communications frame instances including said second header and said redundant destination addresses from said first control element via both a first switching plane and a second switching plane;
- receiving said communications frame instances at a second control element via both said first switching plane and said second switching plane; and
- retaining one of said communications frame instances received via said first switching plane and second switching plane, wherein the step of retaining one of said communications frame instances includes the step of decapsulating said communications frame instances.

11. The communications method as recited in claim 10, wherein the step of retaining one of said communications frame instances includes the step of discarding one of said communications frame instances based on a sequence number associated with said communications frame instances.

12. The communications method as recited in claim 10, wherein the step of retaining one of said communications frame instances includes the step of discarding one of said communication frame instances based on a checksum associated with said communications frame instances.

13. A communications system in a network using a redundant switching architecture, the system comprising:
- means for generating a communications frame including a first header at a first control element;
- means for mapping said first header to a second header and encapsulating said communications frame with a set of two redundant destination addresses, whereby two instances of said communications frame are created;
- means for transmitting said communications frame instances including said second header and said redundant destination addresses from said first control element via both a first switching plane and a second switching plane;
- means for receiving said communications frame instances at a second control element via both said first switching plane and said second switching plane; and
- means for retaining one of said communications frame instances received via said first switching plane and second switching plane, wherein said means for retaining one of said communications frame instances includes further comprises means for decapsulating said communications frame instances.

14. The communications system as recited in claim 13, wherein said means for retaining one of said communications frame instance includes means for discarding one of said communications frame instances based on a sequence number positioned associated with said communications frame instances.

15. The communications system as recited in claim 13, wherein said means for retaining one of said communications frame instances includes means for discarding one of said communications frame instances based on a checksum associated with said communications frame instances.

* * * * *